(12) United States Patent
Pekar et al.

(10) Patent No.: US 11,619,189 B2
(45) Date of Patent: *Apr. 4, 2023

(54) INTEGRATED OPTIMIZATION AND CONTROL OF AN ENGINE AND AFTERTREATMENT SYSTEM

(71) Applicant: Garrett Transportation I Inc., Torrance, CA (US)

(72) Inventors: Jaroslav Pekar, Pacov (CZ); Daniel Pachner, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,512

(22) Filed: Sep. 23, 2021

(65) Prior Publication Data

US 2022/0010745 A1    Jan. 13, 2022

Related U.S. Application Data

(63) Continuation of application No. 16/424,362, filed on May 28, 2019, now Pat. No. 11,156,180, which is a
(Continued)

(51) Int. Cl.
*F02D 41/14* (2006.01)
*F02D 41/02* (2006.01)
*F02D 41/00* (2006.01)

(52) U.S. Cl.
CPC ..... *F02D 41/1406* (2013.01); *F02D 41/0235* (2013.01); *F02D 41/005* (2013.01);
(Continued)

(58) Field of Classification Search
CPC ............ F02D 41/1406; F02D 41/0235; F02D 41/005; F02D 2041/1412; F02D 2200/0625; F02D 2200/08
See application file for complete search history.

(56) References Cited

U.S. PATENT DOCUMENTS

| 3,744,461 A | 7/1973 | Davis |
| 4,005,578 A | 2/1977 | McInerney |
| (Continued) | | |

FOREIGN PATENT DOCUMENTS

| CN | 102063561 A | 5/2011 |
| CN | 102331350 A | 1/2012 |
| (Continued) | | |

OTHER PUBLICATIONS

"SCR, 400-csi Coated Catalyst," Leading NOx Control Technologies Status Summary, 1 page prior to Feb. 2, 2005.
(Continued)

*Primary Examiner* — Xiao En Mo
(74) *Attorney, Agent, or Firm* — Seager, Tufte & Wickhem, LLP (57) ABSTRACT

An engine and one or more aftertreatment subsystems integrated into one system for optimization and control. At least one controller may be connected to the engine and the one or more aftertreatment subsystems. The controller may contain and execute a program for the optimization and control of the one system. Controller may receive information pertinent to the engine and the one or more aftertreatment subsystems for the program. The controller may prescribe setpoints and constraints for measured variables and positions of actuators according to the program to aid in effecting the optimization and control of the one system.

20 Claims, 5 Drawing Sheets

Related U.S. Application Data continuation of application No. 13/290,025, filed on Nov. 4, 2011, now abandoned.

(52) U.S. Cl.
CPC ............. F02D 2041/1412 (2013.01); F02D 2200/0625 (2013.01); F02D 2200/08 (2013.01)

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamei et al. |
| 4,671,235 A | 6/1987 | Hosaka |
| 4,677,559 A | 6/1987 | Van Brück |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A | 4/1998 | Wassick et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong |
| 6,048,628 A | 4/2000 | Hillmann et al. |
| 6,055,810 A | 5/2000 | Borland et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,724 B1 | 11/2001 | Kakuyama et al. |
| 6,321,538 B2 | 11/2001 | Hasler |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,803 B1 | 5/2002 | Sumilla et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 10/2002 | Asik et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,481,139 B2 | 11/2002 | Weldle |
| 6,494,038 B2 | 12/2002 | Kobayashi et al. |
| 6,502,391 B1 | 1/2003 | Hirota et al. |
| 6,502,550 B1 | 1/2003 | Kotwicki et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,546,329 B2 | 4/2003 | Bellinger |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |

(56) References Cited

U.S. PATENT DOCUMENTS

| | | |
|---|---|---|
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Sumilla |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,839,637 B2 | 1/2005 | Moteki et al. |
| 6,849,030 B2 | 2/2005 | Yamamoto et al. |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rösel et al. |
| 7,039,475 B2 | 5/2006 | Sayyarrodsari et al. |
| 7,047,938 B2 | 5/2006 | Flynn et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,069,903 B2 | 7/2006 | Sumilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Sumilla |
| 7,111,455 B2 | 9/2006 | Okugawa et al. |
| 7,113,835 B2 | 9/2006 | Boyden et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,275,518 B1 | 10/2007 | Gartner et al. |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |
| 7,383,118 B2 | 6/2008 | Imai et al. |
| 7,389,773 B2 | 6/2008 | Stewart et al. |
| 7,392,129 B2 | 6/2008 | Hill et al. |
| 7,398,082 B2 | 7/2008 | Schwinke et al. |
| 7,398,149 B2 | 7/2008 | Ueno et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |
| 7,474,953 B2 | 1/2009 | Hülser et al. |
| 7,493,236 B1 | 2/2009 | Mock et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,542,842 B2 | 6/2009 | Hill et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,603,226 B2 | 10/2009 | Henein |

(56) References Cited

U.S. PATENT DOCUMENTS

| | | |
|---|---|---|
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,676,318 B2 | 3/2010 | Allain |
| 7,698,004 B2 | 4/2010 | Boyden et al. |
| 7,702,519 B2 | 4/2010 | Boyden et al. |
| 7,725,199 B2 | 5/2010 | Brackney |
| 7,734,291 B2 | 6/2010 | Mazzara, Jr. |
| 7,743,606 B2 | 6/2010 | Havlena et al. |
| 7,748,217 B2 | 7/2010 | Muller |
| 7,752,840 B2 | 7/2010 | Stewart |
| 7,765,792 B2 | 8/2010 | Rhodes et al. |
| 7,779,680 B2 | 8/2010 | Sasaki et al. |
| 7,793,489 B2 | 9/2010 | Wang et al. |
| 7,798,938 B2 | 9/2010 | Matsubara et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Vouzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,891,669 B2 | 2/2011 | Araujo et al. |
| 7,904,280 B2 | 3/2011 | Wood |
| 7,905,103 B2 | 3/2011 | Larsen et al. |
| 7,907,769 B2 | 3/2011 | Sammak et al. |
| 7,930,044 B2 | 4/2011 | Attarwala |
| 7,933,849 B2 | 4/2011 | Bartee et al. |
| 7,958,730 B2 | 6/2011 | Stewart |
| 7,970,482 B2 | 6/2011 | Srinivasan et al. |
| 7,987,145 B2 | 7/2011 | Baramov |
| 3,001,767 A1 | 8/2011 | Kakuya et al. |
| 7,996,140 B2 | 8/2011 | Stewart et al. |
| 3,019,911 A1 | 9/2011 | Dressier et al. |
| 3,025,167 A1 | 9/2011 | Schneider et al. |
| 8,032,235 B2 | 10/2011 | Sayyar-Rodsari |
| 8,060,290 B2 | 11/2011 | Stewart et al. |
| 8,078,291 B2 | 12/2011 | Pekar et al. |
| 8,109,255 B2 | 2/2012 | Stewart et al. |
| 8,121,818 B2 | 2/2012 | Gorinevsky |
| 8,209,963 B2 | 7/2012 | Kesse et al. |
| 8,229,163 B2 | 7/2012 | Coleman et al. |
| 8,265,854 B2 | 9/2012 | Stewart et al. |
| 8,281,572 B2 | 10/2012 | Chi et al. |
| 8,311,653 B2 | 11/2012 | Zhan et al. |
| 8,312,860 B2 | 11/2012 | Yun et al. |
| 8,360,040 B2 | 1/2013 | Stewart et al. |
| 8,379,267 B2 | 2/2013 | Mestha et al. |
| 8,396,644 B2 | 3/2013 | Kabashima et al. |
| 8,453,431 B2 | 6/2013 | Wang et al. |
| 8,478,506 B2 | 7/2013 | Grichnik et al. |
| RE44,452 E | 8/2013 | Stewart et al. |
| 8,505,278 B2 | 8/2013 | Farrell et al. |
| 8,543,170 B2 | 9/2013 | Mazzara, Jr. et al. |
| 8,555,613 B2 | 10/2013 | Wang et al. |
| 8,596,045 B2 | 12/2013 | Tuomivaara et al. |
| 8,649,884 B2 | 2/2014 | MacArthur et al. |
| 8,649,961 B2 | 2/2014 | Hawkins et al. |
| 8,694,197 B2 | 4/2014 | Rajagopalan et al. |
| 8,700,291 B2 | 4/2014 | Herrmann |
| 8,751,241 B2 | 6/2014 | Oesterling et al. |
| 8,762,026 B2 | 6/2014 | Wolfe et al. |
| 8,763,377 B2 | 7/2014 | Yacoub |
| 8,813,690 B2 | 8/2014 | Kumar et al. |
| 8,892,221 B2 | 11/2014 | Kram et al. |
| 8,904,760 B2 | 12/2014 | Mital |
| 9,170,573 B2 | 10/2015 | Kihas |
| 9,223,301 B2 | 12/2015 | Stewart et al. |
| 9,243,576 B2 | 1/2016 | Yu et al. |
| 9,253,200 B2 | 2/2016 | Schwarz et al. |
| 2002/0116104 A1 | 8/2002 | Kawashima et al. |
| 2003/0089102 A1 | 5/2003 | Colignon et al. |
| 2003/0150961 A1 | 8/2003 | Boelitz et al. |
| 2004/0006973 A1 | 1/2004 | Makki et al. |
| 2004/0034460 A1 | 2/2004 | Folkerts et al. |
| 2004/0086185 A1 | 5/2004 | Sun |
| 2004/0117766 A1 | 6/2004 | Mehta et al. |
| 2004/0118107 A1 | 6/2004 | Ament |
| 2004/0144082 A1 | 7/2004 | Mianzo et al. |
| 2004/0165781 A1 | 8/2004 | Sun |
| 2004/0199481 A1 | 10/2004 | Hartman et al. |
| 2004/0221889 A1 | 11/2004 | Dreyer et al. |
| 2004/0226287 A1 | 11/2004 | Edgar et al. |
| 2005/0143952 A1 | 6/2005 | Fomoyasu et al. |
| 2005/0171667 A1 | 8/2005 | Morita |
| 2005/0187643 A1 | 8/2005 | Sayyar-Rodsari et al. |
| 2005/0193739 A1 | 9/2005 | Brunell et al. |
| 2005/0209714 A1 | 9/2005 | Rawlings et al. |
| 2005/0210868 A1 | 9/2005 | Funabashi |
| 2006/0047607 A1 | 3/2006 | Boyden et al. |
| 2006/0111881 A1 | 5/2006 | Jackson |
| 2006/0168945 A1 | 8/2006 | Samad et al. |
| 2006/0265203 A1 | 11/2006 | Jenny et al. |
| 2006/0282178 A1 | 12/2006 | Das et al. |
| 2006/0287795 A1 | 12/2006 | Samad et al. |
| 2007/0142936 A1 | 6/2007 | Denison et al. |
| 2007/0144149 A1 | 6/2007 | Kolavennu et al. |
| 2007/0156259 A1 | 7/2007 | Baramov et al. |
| 2007/0163244 A1 | 7/2007 | Federle |
| 2007/0235011 A1 | 10/2007 | Easley et al. |
| 2007/0245714 A1* | 10/2007 | Frazier ............... F01N 3/208 |
| | | 60/276 |
| 2007/0261654 A1 | 11/2007 | Butcher et al. |
| 2007/0275471 A1 | 11/2007 | Coward |
| 2008/0010973 A1 | 1/2008 | Gimbres |
| 2008/0071395 A1 | 3/2008 | Pachner |
| 2008/0097625 A1 | 4/2008 | Vouzis et al. |
| 2008/0103747 A1 | 5/2008 | Macharia et al. |
| 2008/0103748 A1 | 5/2008 | Axelrud et al. |
| 2008/0104003 A1 | 5/2008 | Macharia et al. |
| 2008/0109100 A1 | 5/2008 | Macharia et al. |
| 2008/0125875 A1 | 5/2008 | Stewart et al. |
| 2008/0132178 A1 | 6/2008 | Chatterjee et al. |
| 2008/0183311 A1 | 7/2008 | MacArthur et al. |
| 2008/0208778 A1 | 8/2008 | Sayyar-Rodsari et al. |
| 2008/0244449 A1 | 10/2008 | Morrison et al. |
| 2008/0276914 A1* | 11/2008 | Bleile ............... F02D 41/0072 |
| | | 123/568.21 |
| 2009/0005889 A1 | 1/2009 | Sayyar-Rodsari |
| 2009/0008351 A1 | 1/2009 | Schneider et al. |
| 2009/0043546 A1 | 2/2009 | Srinivasan et al. |
| 2009/0131216 A1 | 5/2009 | Matsubara et al. |
| 2009/0182518 A1 | 7/2009 | Chu et al. |
| 2009/0198350 A1 | 8/2009 | Thiele |
| 2009/0240480 A1 | 9/2009 | Baramov |
| 2009/0254202 A1 | 10/2009 | Pekar et al. |
| 2009/0287320 A1 | 11/2009 | MacGregor et al. |
| 2009/0312998 A1 | 12/2009 | Berckmans et al. |
| 2010/0017094 A1 | 1/2010 | Stewart et al. |
| 2010/0038158 A1 | 2/2010 | Whitney et al. |
| 2010/0050607 A1 | 3/2010 | He et al. |
| 2010/0122523 A1 | 5/2010 | Vosz |
| 2010/0126481 A1 | 5/2010 | Willi et al. |
| 2010/0204808 A1 | 8/2010 | Thiele |
| 2010/0268353 A1 | 10/2010 | Crisalle et al. |
| 2010/0300069 A1 | 12/2010 | Herrmann et al. |
| 2010/0300070 A1 | 12/2010 | He et al. |
| 2010/0305719 A1 | 12/2010 | Pekar et al. |
| 2010/0327090 A1 | 12/2010 | Havlena et al. |
| 2011/0006025 A1 | 1/2011 | Schneider et al. |
| 2011/0010073 A1 | 1/2011 | Stewart et al. |
| 2011/0029235 A1 | 2/2011 | Berry |
| 2011/0046752 A1 | 2/2011 | Piche |
| 2011/0056265 A1 | 3/2011 | Yacoub |
| 2011/0060424 A1 | 3/2011 | Havlena |
| 2011/0066308 A1 | 3/2011 | Yang et al. |

(56) References Cited

U.S. PATENT DOCUMENTS

| | | |
|---|---|---|
| 2011/0071653 A1 | 3/2011 | Kihas |
| 2011/0087420 A1 | 4/2011 | Stewart et al. |
| 2011/0104015 A1 | 5/2011 | Boyden et al. |
| 2011/0125293 A1 | 5/2011 | Havlena |
| 2011/0125295 A1 | 5/2011 | Bednasch et al. |
| 2011/0131017 A1 | 6/2011 | Cheng et al. |
| 2011/0167025 A1 | 7/2011 | Danai et al. |
| 2011/0264353 A1 | 10/2011 | Atkinson et al. |
| 2011/0270505 A1 | 11/2011 | Chaturvedi et al. |
| 2011/0301723 A1 | 12/2011 | Pekar et al. |
| 2012/0024089 A1 | 2/2012 | Couey et al. |
| 2012/0109620 A1 | 5/2012 | Gaikwad et al. |
| 2013/0111905 A1 | 5/2013 | Pekar et al. |
| 2013/0131956 A1 | 5/2013 | Thibault et al. |
| 2013/0204403 A1 | 8/2013 | Zheng et al. |
| 2013/0338900 A1 | 12/2013 | Ardanese et al. |
| 2014/0032189 A1 | 1/2014 | Hehle et al. |
| 2014/0034460 A1 | 2/2014 | Chou |
| 2014/0318216 A1 | 10/2014 | Singh |
| 2014/0343713 A1 | 11/2014 | Ziegler et al. |
| 2014/0358254 A1 | 12/2014 | Chu et al. |
| 2015/0121071 A1 | 4/2015 | Schwarz et al. |
| 2015/0354877 A1 | 12/2015 | Burns et al. |

FOREIGN PATENT DOCUMENTS

| | | |
|---|---|---|
| DE | 19628796 C1 | 10/1997 |
| DE | 19858584 A1 | 6/2000 |
| DE | 10219382 A1 | 11/2002 |
| DE | 102009016509 A1 | 10/2010 |
| DE | 102011103346 A1 | 8/2012 |
| EP | 0301527 A2 | 2/1989 |
| EP | 0877309 B1 | 6/2000 |
| EP | 1134368 A2 | 9/2001 |
| EP | 1180583 A2 | 2/2002 |
| EP | 1221544 A2 | 7/2002 |
| EP | 1225490 A2 | 7/2002 |
| EP | 1245811 A2 | 10/2002 |
| EP | 1273337 A1 | 1/2003 |
| EP | 0950803 B1 | 9/2003 |
| EP | 1420153 A2 | 5/2004 |
| EP | 1447727 A2 | 8/2004 |
| EP | 1498791 A1 | 1/2005 |
| EP | 1425642 B1 | 11/2005 |
| EP | 1686251 A1 | 8/2006 |
| EP | 1399784 B1 | 10/2007 |
| EP | 2107439 A1 | 10/2009 |
| EP | 2146258 A1 | 1/2010 |
| EP | 1794339 B1 | 7/2011 |
| EP | 1529941 B1 | 11/2011 |
| EP | 2543845 A1 | 1/2013 |
| EP | 2551480 A1 | 1/2013 |
| EP | 2589779 A2 | 5/2013 |
| EP | 2617975 A1 | 7/2013 |
| EP | 2267559 B1 | 1/2014 |
| EP | 2919079 A2 | 9/2015 |
| JP | S59190443 A | 10/1984 |
| JP | 2010282618 A | 12/2010 |
| WO | 0144629 A2 | 6/2001 |
| WO | 0232552 A1 | 4/2002 |
| WO | 02097540 A1 | 12/2002 |
| WO | 02101208 A1 | 12/2002 |
| WO | 03023538 A2 | 3/2003 |
| WO | 2003048533 A1 | 6/2003 |
| WO | 03065135 A1 | 8/2003 |
| WO | 03078816 A1 | 9/2003 |
| WO | 2004027230 A1 | 4/2004 |
| WO | 2006021437 A1 | 3/2006 |
| WO | 2007078907 A2 | 7/2007 |
| WO | 2008033800 A2 | 3/2008 |
| WO | 2008115911 A1 | 9/2008 |
| WO | 2011130832 A1 | 10/2011 |
| WO | 2012076838 A2 | 6/2012 |
| WO | 2013119665 A1 | 8/2013 |
| WO | 2014165439 A2 | 10/2014 |
| WO | 2016053194 A1 | 4/2016 |

OTHER PUBLICATIONS

Advanced Petroleum-Based Fuels-Diesel Emissions Control (APBF-DEC) Project, "Quarterly Update," No. 7, 6 pages, Fall 2002.

Allanson, et al; "Optimizing the Low Temperature Performance and Regeneration Efficiency of the Continuously Regenerating Diesel Particulate Filter System," SAE Paper No. 2002-01-0428, 8 pages, Mar. 2002.

Amstutz, et al; "EGO Sensor Based Robust Output Control of EGR in Diesel Engines," IEEE TCST, vol. 3, No. 1, 12 pages, Mar. 1995.

Bemporad et al; "Explicit Model Predictive Control," 1 page, prior to Feb. 2, 2005.

Bertsekas, "On the Goldstein-Levitin-Polyak Gradient Projection Method," IEEE Transactions on Automatic Control, vol. AC-21. No. 2, pp. 174-184, Apr. 1976.

Bertsekas, Projected Newton Methods for Optimization Problems with Simple Constraints*, SIAM J. Control and Optimization, vol. 20, No. 2, pp. 221-246, Mar. 1982.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3rd Quarter, 2003.

Chatterjee, et al; "Catalytic Emission Control for Heavy Duty Diesel Engines," JM, 46 pages, prior to Feb. 2, 2005.

De Schutter et al; "Model Predictive Control for Max-Min-Plus-Scaling Systems," Proceedings of the 2001 American Control Conference, Arlington, Va, pp. 319-324, Jun. 2001.

Delphi, Delphi Diesel NOx Trap (DNT), 3 pages, Feb. 2004.

Diehl et al; "Efficient Numerical Methods for Nonlinear MPC and Moving Horizon Estimation," Int. Workshop on Assessment and Future Directions of NMPC, 24 pages, Pavia, Italy, Sep. 5-9, 2008.

GM "Advanced Diesel Technology and Emissions," powertrain technologies—engines, 2 pages, prior to Feb. 2, 2005.

Guerreiro et al; "Trajectory Tracking Nonlinear Model Predictive Control for Autonomous Surface Craft," Proceedings of the European Control Conference, Budapest, Hungary, 6 pages, Aug. 2009.

Guzzella, et al; "Control of Diesel Engines," IEEE Control Systems Magazine, pp. 53-71, Oct. 1998.

Havlena, "Componentized Architecture for Advanced Process Management," Honeywell International, 42 pages, 2004.

Hiranuma, et al; "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DPQ) Concepts Reference," 48 pages, prior to Feb. 2, 205.

http://www.not2fast.wryday.com/turbo/glossary/turbo_glossary.shtml, "Not2Fast:Turbo Glossary," 22 pages, printed Oct. 1, 2004.

http://www.tai-cmv.com/sb1106.0.html, "Technical Overview—Advanced Control Solutions," 6 pages, printed Sep. 9, 2004.

Jonsson, "Fuel Optimized Predictive Following in Low Speed Conditions," Master's Thesis, 46 pages, Jun. 28, 2003.

Kelly et al; "Reducing Soot Emissions from Diesel Engines Using One Atmosphere Uniform Glow Discharge Plasma," SAE Paper No. 2003-01-1183, Mar. 2003.

Kolmanovsky, et al; "Issues in Modeling and Control of Intake Flow in Variable Geometry Turbocharged Engines", 18th IFIP Conf. System Modeling and Optimization, pp. 436-445, Jul. 1997.

Kulhavy et al; "Emerging Technologies for Enterprise Optimization in the Process Industries," Honeywell, 12 pages, Dec. 2000.

Locker, et al; "Diesel Particulate Filter Operational Characterization," Corning Incorporated, 10 pages, prior to Feb. 2, 2005.

Lu, "Challenging Control Problems and Engineering Technologies in Enterprise Optimization," Honeywell Hi-Spec Solutions, 30 pages, Jun. 4-6, 2001.

Mehta, "The Application of Model Predictive Control to Active Automotive Suspensions," 56 pages, May 17, 1996.

(56) References Cited

OTHER PUBLICATIONS

Moore, "Living with Cooled-EGR Engines," Prevention Illustrated, 3 pages, Oct. 3, 2004.
Murayama et al; "Speed Control of Vehicles with Variable Lift Engine by Nonlinear MPC," ICROS-SICE International Joint Conference, pp. 4128-4133, 2009.
National Renewable Energy Laboratory (NREL), Diesel Emissions Control—Sulfur Effects Project (DECSE) Summary of Reports, U.S Department of Energy, 19 pages, Feb. 2022.
Salvat, et al; "Passenger Car Serial Application of a Particulate Filter System on a Common Rail Direct Injection Engine," SAE Paper No. 2000-01-0473, 14 pages, Feb. 2000.
Shamma, et al. "Approximate Set-Valued Observers for Nonlinear Systems," IEEE Transactions on Automatic Control, vol. 42, No. 5, May 1997.
Soltis, "Current Status of NOx Sensor Development," Workshop on Sensor Needs and Requirements for PEM Fuel Dell and Direct-Injection Engines, 9 pages, Jan. 25-26, 2000.
Stefanopoulpou, et al; "Control of Variable Geometry Turbocharged Diesel Engines for Reduced Emissions," IEEE Transactions on Control Systems Technology, vol. 8, No. 4, pp. 733-745, Jul. 2000.
Storset, et al; "Air Charge Estimation for Turbocharged Diesel Engines," vol. 1, Proceedings of the American Control Conference, 8 pages, Jun. 28-30, 2000.
The Math Works, "Model-Based Calibration Toolbox 2.1 Calibrate complex powertrain Systems," 4 pages, prior to Feb. 2, 2005.
The Math Works, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Van Basshuysen et al; "Lexicon Motorentechnik," (Dictionary of Automotive Technology) published by Vieweg Verlag, Wiesbaden 039936, p. 518, 2004. (English Translation).
Van Den Boom, et al; "MPC for Max-Plus-Linear Systems: Closed Loop Behavior and Tuning," Proceedings of the 2001 American Control Conference, Arlington, VA, pp. 325-330, Jun. 2001.
Van Keulen et al; "Predictive Cruise Control in Hybrid Electric Vehicles," World Electric Vehicle Journal vol. 3, ISSN 2032-6653, pp. 1-11, 2009.
Wang et al; "Fast Model Predictive Control Using Online Optimization," Proceedings of the 17th Worid Congress, the International Federation of Automatic Control, Seoul, Korea, pp. 6974-6979, Jul. 6-11, 2008.
Wang et al; "PSO-Based Model Predictive Control for Nonlinear Processes," Advances in Natural Computation, Lecture Notes in Computer Science, vol. 3611/2005, 8 pages, 2005.
Zavala et al; "The Advance-Step NMPC Controller: Optimality, Stability, and Robustness," Automatica, vol. 45, pp. 86-93, 2009.
Zeilinger et al; "Real-Time MPC—Stability Through Robust MPC Design," Joint 48th IEEE Conference on Decision and Control and 28th Chinese Control Conference, Shanghai, P.R. China, pp. 3980-3986, Dec. 16-18, 2009.
Zelenka, et al; "An Active Regeneration as a Key Element for Safe Particulate Trap Use," SAE Paper No. 2001-0103199, 13 pages, Feb. 2001.
Zhu, "Constrained Nonlinear Model Predictive Control for Vehicle Regulation," Dissertation, Graduate School of the Ohio State University, 125 pages, 2008.
"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"J1979 E/E Diagnostic Test Modules," Proposed Regulation, Vehicle E.E. System Diagnostic Standards Committee, 1 page, Sep. 28, 2010.

"MicroZed Zynq Evaluation and Development and System on Module, Hardware User Guide," Avnet Electronics Marketing, Version 1.6, Jan. 22, 2015.
Actron, "Elite AutoScanner Kit—Enhanced Obd I & II Scan Tool, OBD 1300," Downloaded from https://actron.com/content/elite-autoscanner-kit-enhanced-obd-i-and-obd-ii-scan-tool?utm_ . . . , 5 pages, printed Sep. 27, 2016.
Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Andersson et al., "Fast Physical NOx Prediction in Diesel Engines, The Diesel Engine: The Low CO2 and Emissions Reduction Challenge," Conference Proceedings, Lyon, 2006. Unable to Obtain This Reference.
Arregle et al., "On Board NOx Prediction in Diesel Engines: A Physical Approach," Automotive Model Predictive Control, Models Methods and Applications, Chapter 2, 14 pages, 2010.
Asprion, "Optimal Control of Diesel Engines," PHD Thesis, Diss ETH No. 21593, 436 pages, 2013.
Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.
Bako et al., "A Recursive Identification Algorithm for Switched Linear/Affine Models," Nonlinear Analysis: Hybrid Systems, vol. 5, pp. 242-253, 2011.
Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.
Blanco-Rodriguez, "Modelling and Observation of Exhaust Gas Concentrations for Diesel Engine Control," Phd Dissertation, 242 pages, Sep. 2013.
Blue Streak Electronics Inc., "Ford Modules," 1 page, May 12, 2010.
Bourn et al., "Advanced Compressor Engine Controls to Enhance Operation, Reliability and Integrity," Southwest Research Institute, DOE Award No. DE-FC26-03NT41859, SwRI Project No. 03.10198, 60 pages, Mar. 2004.
Charalampidis et al., "Computationally Efficient Kalman Filtering for a Class of Nonlinear Systems," IEEE Transactions on Automatic Control, vol. 56, No. 3, pp. 483-491, Mar. 2011.
Chew, "Sensor Validation Scheme with Virtual NOx Sensing for Heavy Duty Diesel Engines," Master's Thesis, 144 pages, 2007.
European Search Report for EP Application No. EP 10175270.7-2302419 dated Jan. 16, 2013.
European Search Report for EP Application No. EP 15152957.5-1807 dated Feb. 10, 2015.
The Extended European Search Report for EP Application No. 15155295.7-1606, dated Aug. 4, 2015.
The Extended European Search Report for EP Application No. 15179435.1, dated Apr. 1, 2016.
U.S. Appl. No. 15/005,406, filed Jan. 25, 2016.
U.S. Appl. No. 15/011,445, filed Jan. 29, 2016.
Desantes et al., "Development of NOx Fast Estimate Using NOx Sensor," EAEC 2011 Congress, 2011. Unable to Obtain This Reference.
Ding, "Characterising Combustion in Diesel Engines, Using Parameterised Finite Stage Cylinder Process Models," 281 pages, Dec. 21, 2011.
Docquier et al., "Combustion Control and Sensors: a Review," Progress in Energy and Combustion Science, vol. 28, pp. 107-150, 2002.
Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.

(56) References Cited

OTHER PUBLICATIONS

Ericson, "NOx Modelling of a Complete Diesel Engine/SCR System," Licentiate Thesis, 57 pages, 2007.
Finesso et al., "Estimation of the Engine-Out NO2/NOx Ration in a Euro VI Diesel Engine," SAE International 2013-01-0317, 15 pages, Apr. 8, 2013.
Fleming, "Overview of Automotive Sensors," IEEE Sensors Journal, vol. 1, No. 4, pp. 296-308, Dec. 2001.
Ford Motor Company, "2012 My OBD System Operation Summary for 6.7L Diesel Engines," 149 pages, Apr. 21, 2011.
Formentin et al., "NOx Estimation in Diesel Engines Via In-Cylinder Pressure Measurement," IEEE Transactions on Control Systems Technology, vol. 22, No. 1, pp. 396-403, Jan. 2014.
Galindo, "An On-Engine Method for Dynamic Characterisation of NOx Concentration Sensors," Experimental Thermal and Fluid Science, vol. 35, pp. 470-476, 2011.
Gamma Technologies, "Exhaust Aftertreatment with GT-Suite," 2 pages, Jul. 17, 2014.
Goodwin, "Researchers Hack A Corvette's Brakes Via Insurance Black Box," Downloaded from http://www.cnet.com/roadshow/news/researchers-hack-a-corvettes-brakes-via-insurance-black-box/, 2 pages, Aug. 2015.
Geenberg, "Hackers Remotely Kill A Jeep On The Highway—With Me In It," Downloaded from http://www.wired.com/2015/07/hackers-remotely-kill-jeep-highway/, 24 pages, Jul. 21, 2015.
Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.
Guardiola et al., "A Computationally Efficient Kalman Filter Based Estimator for Updating Look-Up Tables Applied to NOx Estimation in Diesel Engines," Control Engineering Practice, vol. 21, pp. 1455-1468.
Guzzella et al., "Introduction to Modeling and Control of Internal Combustion Engine Systems," 303 pages, 2004.
Hahlin, "Single Cylinder ICE Exhaust Optimization," Master's Thesis, retrieved from https://pure.ltu.se/portal/tiles/44015424/LTU-EX-2013-43970821.pdf, 50 pages, Feb. 1, 2014.
Hammacher Schlemmer, "The Windshield Heads Up Display," Catalog, p. 47, prior to Apr. 26, 2016.
Heywood, "Pollutant Formation and Control," Internal Combustion Engine Fundamentals, pp. 567-667, 1988.
Hirsch et al., "Dynamic Engine Emission Models," Automotive Model Predictive Control, Chapter 5, 18 pages, LNCIS 402, 2012.
Hirsch et al., "Grey-Box Control Oriented Emissions Models," The International Federation of Automatic Control (IFAC), Proceedings of the 17th World Congress, pp. 8514-8519, Jul. 6-11, 2008.
Hockerdal, "EKF-based Adaptation of Look-Up Tables with an Air Mass-Flow Sensor Application," Control Engineering Practice, vol. 19, 12 pages, 2011.
http://nexceris.com/news/nextech-materials/, "NEXTECH Materials is Now NEXCERIS," 7 pages, printed Oct. 4, 2016.
http://www.arb.ca.gov/msprog/obdprog/hdobdreg.htm, "Heavy-Duty OBD Regulations and Rulemaking," 8 pages, printed Oct. 4, 2016.
https://www.dieselnet.com/standards/us/obd.php, "Emission Standards: USA: On-Board Diagnostics," 6 pages, printed Oct. 3, 2016.
International Search Report for Corresponding Application No. EP12191156 dated Feb. 2, 2015.
https://www.en.wikipedia.org/wiki/Public-key_cryptography, "Public-Key Cryptography," 14 pages, printed Feb. 26, 2016.
Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.
Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.

Jensen, "The 13 Monitors of an OBD System," http://www.oemoffhighway.com/article/1 0855512/the-13-monito . . . , 3 pages, printed Oct. 3, 2016.
Khair et al., "Emission Formation in Diesel Engines," Downloaded from https://www.dieselnet.com/tech/diesel_emiform.php, 33 pages, printed Oct. 14, 2016.
Kihas et al., "Chapter 14, Diesel Engine SCR Systems: Modeling Measurements and Control," Catalytic Reduction Technology (book), Part 1, Chapter 14, prior to Jan. 29, 2016.
Krause et al., "Effect of Inlet Air Humidity and Temperature on Diesel Exhaust Emissions," SAE International Automotive Engineering Congress, 8 pages, Jan. 8-12, 1973.
Lavoie et al., "Experimental and Theoretical Study of Nitric Oxide Formation in Internal Combustion Engines," Combustion Science and Technology, vol. 1, pp. 313-326, 1970.
Manchur et al., "Time Resolution Effects on Accuracy of Real-Time NOx Emissions Measurements," SAE Technical Paper Series 2005-01-0674,2005 SAE World Congress, 19 pages, Apr. 11-14, 2005.
Mohammadpour et al., "A Survey on Diagnostics Methods for Automotive Engines," 2011 American Control Conference, pp. 985-990, Jun. 29-Jul. 1, 2011.
Moos, "Catalysts as Sensors—A Promising Novel Approach in Automotive Exhaust Gas Aftertreatment," http://www.mdpi.com/1424-8220/10/7/6773htm, 10 pages, Jul. 13, 2010.
Olsen, "Analysis and Simulation of the Rate of Heat Release (ROHR) in Diesel Engines," MSc-Assignment, 105 pages, Jun. 2013.
Pipho et al., "NO2 Formation in a Diesel Engine," SAE Technical Paper Series 910231, International Congress and Exposition, 15 pages, Feb. 25-Mar. 1, 1991.
Querel et al., "Control of an SCR System Using a Virtual NOx Sensor," 7th IFAC Symposium on Advances in Automotive Control, The International Federation of Automotive Control, pp. 9-14, Sep. 4-7, 2013.
Ricardo Software, "Powertrain Design at Your Fingertips," retrieved from http://www.ricardo.com/PageFiles/864/WaveFlyerA4_4PP.pdf, 2 pages, downloaded Jul. 27, 2015.
Santin et al., "Combined Gradient/Newton Projection Semi-Explicit QP Solver for Problems with Bound Constraints," 2 pages, prior to Jan. 29, 2016.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling, "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Signer et al., "European Programme on Emissions, Fuels and Engine Technologies (EPEFE)—Heavy Duty Diesel Study," International Spring Fuels and Lubricants Meeting, SAE 961074, May 6-8, 1996.
Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000. Unable to Obtain This Reference.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.

(56) References Cited

OTHER PUBLICATIONS

Tschanz et al., "Feedback Control of Particulate Matter and Nitrogen Oxide Emissions in Diesel Engines," Control Engineering Practice, vol. 21, pp. 1809-1820, 2013.
Turner, "Automotive Sensors, Sensor Technology Series," Momentum Press, Unable to Obtain the Entire Book, the Front and Back Covers and Table of Contents are Provided, 2009.
Van Helden et al., "Optimization of Urea SCR deNOx Systems for HD Diesel Engines," SAE International 2004-01-0154, 13 pages, 2004.
Vdo, "UniNOx-Sensor Specification," Continental Trading GmbH, 2 pages, Aug. 2007.
Vereschaga et al., "Piecewise Affine Modeling of NOx Emission Produced by a Diesel Engine," 2013 European Control Conference (ECC), pp. 2000-2005, Jul. 17-19, 2013.
Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.
Wang et al., "Sensing Exhaust NO2 Emissions Using the Mixed Potential Principal," SAE 2014-01-1487, 7 pages, Apr. 1, 2014.
Wilhemsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.
Wilhemsson et al., "A Physical Two-Zone NOx Model Intended for Embedded Implementation," SAE 2009-01-1509, 11 pages, 2009.
Winkler et al., "Incorporating Physical Knowledge About the Formation of Nitric Oxides into Evolutionary System Identification," Proceedings of the 20th European Modeling and Simulation Symposium (EMSS), 6 pages, 2008.
Winkler et al., "On-Line Modeling Based On Genetic Programming," 12 pages, International Journal on Intelligent Systems Technologies and Applications 2, 2007.
Winkler et al., "Using Genetic Programming in Nonlinear Model Identification," 99 pages, prior to Jan. 29, 2016.
Winkler et al., "Virtual Sensors for Emissions of a Diesel Engine Produced by Evolutionary System Identification," LNCS, vol. 5717, 8 pages, 2009.
Winkler "Evolutionary System Identification - Modern Approaches and Practical Applications," Kepler Universitat Linz, Reihe C: Technik und Naturwissenschaften, Universitatsveriag Rudolf Trauner, 2009. Unable to Obtain This Reference.
Wong, "Carb Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.
Yao et al., "The Use of Tunnel Concentration Profile Data to Determine the Ratio of NO2/NOx Directly Emitted from Vehicles," HAL Archives, 19 pages, 2005.
Zaman, "Lincoln Motor Company: Case study 2015 Lincoln MKC," Automotive Electronic Design Fundamentals, Chapter 6, 2015.
Zeldovich, "The Oxidation of Nitrogen in Combustion and Explosions," ACTA Physiochimica U.R.S.S., vol. XX1, No. 4, 53 pages, 1946.
Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.
Examination Report for EP Application Serial No. 12191156.4 dated Nov. 25, 2016.
Von et al., "Beitrag Zur Automatisierten Steuerkennfeld-Applikation bei Fahrzeug-Dieselmotoren," 178 pages, dated Aug. 28, 2008, retrieved from the internet at: http://opus.kobv.de/tuberiin/volltexte/2008/1972/pdf/jankov_kristian.pdf on Aug. 29, 2012.
"Model Predictive Control," Wikipedia, pp. 1-5, Jan. 22, 2009. http://en.wikipedia.org/w/index.php/title=Special:Book&bookcmd=download & collection id=641cdlb5da77cc22&writer=rl&return_to= Model predictive control, retrieved Nov. 20, 2012.
Axehill et al; "A Dual Gradient Projection Quadratic Programming Algorithm Tailored for Model Predictive Control," Proceedings of the 47th IEEE Conference on Decision and Control, Cancun Mexico, pp. 3057-3064, Dec. 9-11, 2008.
Axehill et al; "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.
Baffi et al; "Non-Linear Model Based Predictive Control through Dynamic Non-Linear Partial Least Squares," Trans IChemE, vol. 80, Part A, pp. 75-86, Jan. 2002.
Search Report for Corresponding, Application No. 11167549.2 dated Nov. 27, 2012.
De Oliveira, "Constraint Handling and Stability Properties of Model Predictive Control," Carnegie Institute of Technology, Department of Chemical Engineering, Paper 197, 64 pages, Jan. 1, 1993.
Dunbar, "Model Predictive Control: Extension to Coordinated Multi-Vehicle Formations and Real-Time Implementation," CDS Technical Report 01-016, 64 pages, Dec. 7, 2001.
Patrinos et al; "A Global Piecewise Smooth Newton Method for Fast Large Large-Scale Model Predictive Control," Tech Report TR 2010-02, National Technical University of Athens, 23 pages, 2010.
Rajamani, "Data-based Techniques to Improve State Estimation in Model Predictive Control," Ph.D. Dissertation, 257 pages, 2007.
Takacs et al; "Newton-Raphson Based Efficient Model Predictive Control Applied on Active Vibrating Structures," Proceeding of the European Control Conference 2009, Budapest, Hungary, pp. 2845-2850, Aug. 23-26, 2009.
Wright, "Applying New Optimization Algorithms to Model Predictive Control," 5th International Conference on Chemical Process Control, 10 pages, 1997.
"Model Predictive Control Toolbox Release Notes," The Mathworks, 24 pages, Oct. 2008.
"MPC Implementation Methods for the Optimization of the Response of Control Valves to Reduce Variability," Advanced Application Note 002, Rev. A, 10 pages, 2007.
Bemporad et al; "Model Predictive Control Toolbox 3 User's Guide," Matlab Mathworks, 282 pages, 2008.
Bemporad et al; "The Explicit Linear Quadratic Regulator for Constrained Systems," Automatica, 38, pp. 3-20, 2002.
Bemporad, "Model Predictive Control Based on Linear Programming—The Explicit Solution," IEEE Transactions on Automatic Control, vol. 47, No. 12, pp. 1974-1984, Dec. 2002.
Bemporad, Model Predictive Control Design: New Trends and Tools, Proceedings of the 45th IEEE Conference on Decision & Control, pp. 6678-6683, Dec. 13-15, 2006.
Borrelli et al; "An MPC/Hybrid System Approach to Traction Control," IEEE Transactions on Control Systems Technology, vol. 14, No. 3, pp. 541-553, May 2006.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Bunting, "Increased Urea Dosing Could Cut SCR Truck Running Costs," http://www.automotiveworid.com/article/85897-increased-urea-dosing-could-cut-scr-truck-running-costs. Automotive World, 3 pages, Feb. 24, 2011, printed Mar. 2, 2011.
International Application Status Report for WO2008/033800.
U.S. Appl. No. 13/236,217.
U.S. Appl. No. 13/290,012.
Johansen et al; "Hardware Architecture Design for Explicit Model Predictive Control," Proceedings of the ACC, 6 pages, 2006.
Johansen et al; "Hardware Synthesis of Explicit Model Predictive Controllers," IEEE Transactions on Control Systems Technology, vol. 15, No. 1, Jan. 2007.
Keulen et al; "Predictive Cruise Control in Hybrid Electric Vehicles," May 2009, World Electric Journal, vol. 3, ISSN 2032-6653.
Maciejowski, "Predictive Control with Constraints," Prentice Hall, Pearson Education Limited, 4 pages, 2002.
Mariethoz et al; "Sensorless Explicit Model Predictive Control of the DC-DC Buck Converter with Inductor Current Limitation," IEEE Applied Power Electronics Conference and Exposition, pp. 1710-1715, 2008.

(56) References Cited

OTHER PUBLICATIONS

Marjanovic, "Towards a Simplified Infinite Horizon Model Predictive Controller," 6 pages, Proceedings of the 5th Asian Control Conference, 6 pages, Jul. 20-23, 2004.

Mayne et al.; "Constrained Model Predictive Control: Stability and Optimality," Automatica, vol. 36, pp. 789-814, 2000.

Ortner et al; "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.

Ortner et al.; "Predictive Control of a Diesel Engine Air Path," IEEE Transactions on Control Systems Technology, vol. 15, No. 3, pp. 449-456, May 2007.

Pannocchia et al.; "Combined Design of Disturbance Model and Observer for Offset-Free Model Predictive Control," EEE Transactions on Automatic Control, vol. 52, No. 6, 6 pages, 2007.

Qin et al.; "A Survey of Industrial Model Predictive Control Technology," Control Engineering Practice, 11, pp. 733-764, 2003.

Rawlings, "Tutorial Overview of Model Predictive Control," IEEE Control Systems Magazine, pp. 38-52, Jun. 2000.

Schauffele et al.; "Automotive Software Engineering Principles, Processes, Methods, and Tools," SAE International, 10 pages, 2005.

Stewart et al.; "A Model Predictive Control Framework for Industrial Turbodiesel Engine Control," Proceedings of the 17th IEEE Conference on Decision and Control, 8 pages, 2008.

Stewart et al.; "A Modular Model Predictive Controller for Turbodiesel Problems," First Workshop on Automotive Model Predictive Control, Schloss Muhldorf, Feldkirchen, Johannes Kepler University, Linz, 3 pages, 2009.

Tondel et al; "An Algorithm for Multi-Parametric Quadratic Programming and Explicit MPC Solutions," Automatica, 39, pp. 489-497, 2003.

* cited by examiner

INTEGRATED OPTIMIZATION AND CONTROL OF AN ENGINE AND AFTERTREATMENT SYSTEM

This application is a continuation of U.S. patent application Ser. No. 16/424,362, filed May 28, 2019, which is a continuation of Ser. No. 13/290,025, filed Nov. 4, 2011 (now abandoned), both of which are hereby incorporated by reference.

BACKGROUND

The present disclosure pertains to internal combustion engines and particularly to engines having aftertreatment mechanisms.

SUMMARY

The disclosure reveals an engine and one or more aftertreatment subsystems integrated into one system for optimization and control. At least one controller may be connected to the engine and the one or more aftertreatment subsystems. The controller may contain and execute a program for the optimization and control of the one system. Controller may receive information pertinent to the engine and the one or more aftertreatment subsystems for the program. The controller may prescribe setpoints and constraints for measured variables and positions of actuators according to the program to aid in effecting the optimization and control of the one system.

DESCRIPTION

The modern combustion engine appears to be a very complex system. The complexity growth may be driven namely by governmental legislation that restricts combustion engine emissions. Therefore, the original equipment manufacturers (OEMs) may be forced to add various equipment items, sensors and actuators to the engine to achieve the prescribed limits and to optimize engine operating costs, e.g., fuel economy, urea consumption, and so forth. Under these conditions, an engine operation optimization and design of an optimal control system may be a challenging task.

Some approaches may incorporate optimizing the engine and individual aftertreatment systems involving, e.g., selective catalytic reduction (SCR), diesel oxidation catalysts (DOC), diesel particulate filter (DPF), and so on, separately. These approaches do not necessarily provide a systematic way of optimization. They may involve time consuming and expensive tasks. Furthermore, it is not necessarily ensured that their results will be optimal. There might be a better solution.

Another approach may be to optimize the engine together with the aftertreatment subsystem (AFS) as a one system. Such an approach may enable one to find the global optimal behavior of the engine with an aftertreatment subsystem from an economical and technical point of view while satisfying virtually all of the prescribed emission limits. The engine and aftertreatment subsystem may have appropriate sensors and actuators as needed to effect an optimization program for the engine and aftertreatment subsystem or subsystems as one system. The engine may be seen as an exhaust gas source for the aftertreatment subsystem. The properties of the engine out exhaust gas as sensed may be influenced within certain range by manipulating available engine actuators such as those of a turbocharger waste gate (WG), variable geometry turbocharger (VGT), exhaust gas recirculation (EGR), start of injection (SOI), throttling valve (TV), and so on. Various degrees of freedom may be used to prepare or modify the exhaust gas properties for optimal operation of the aftertreatment subsystem at virtually all of the engine operating points. For example, if the actual state of the aftertreatment subsystem does not enable a reduction of emissions due to low temperature as sensed in some operating regimes, then the engine actuators may be controlled to increase temperature so that the engine exhaust gas out emissions do not violate prescribed limits. On the other hand, if the state of the aftertreatment subsystem enables a reduction of a significant amount of pollutants, the engine actuators may be controlled in a way to also achieve the best fuel economy.

An engine optimization and control design may be formulated as a rigorous mathematical optimization problem. The present approach may offer a modular and systematic solution to the problem. The approach may incorporate dividing the engine and aftertreatment optimization and control design into two stages: (i) an off-line part and (ii) an on-line part (real-time).

(i) The off-line part may be formulated as a mathematical optimization problem with constraints (known as mathematical programming) and the results may be various engine maps prescribing setpoints and constraints for different kinds of measured variables from sensors and positions of virtually all engine actuators for virtually all major operating points or conditions of the engine, e.g., over the engine speed and torque map. Virtually all of the maps may be parameterized by various variables of the engine and aftertreatment system but may be also parameterized by measured fuel and/or urea consumption and corresponding costs, by their ratio, or other relevant economically related quantities. Information about actual market prices of fuel and other fluids used by the engine and aftertreatment system may be incorporated to parameterize the control system and may be used as a tuning parameter during the engine's lifetime. This approach may enable a slight tuning of the controller behavior when the prices of the fluids used are changed, which can ensure economically optimal operation of the engine in view of such changes during its lifetime.

(ii) The on-line part may consist of one or more feedback single or multivariable real-time controllers. These controllers may be implemented, for example, as model based predictive controllers (MPCs). The feedback controllers may ensure realization of virtually all of the setpoints, but also satisfaction of virtually all of the constraints computed in the off-line part. The feedback controllers may also ensure disturbance rejection, a minimization of an impact of engine components production variability, and aging of the engine.

Furthermore, the feedback controllers may also be designed to deliver needed performance during an engine transient operation.

Figure 1:
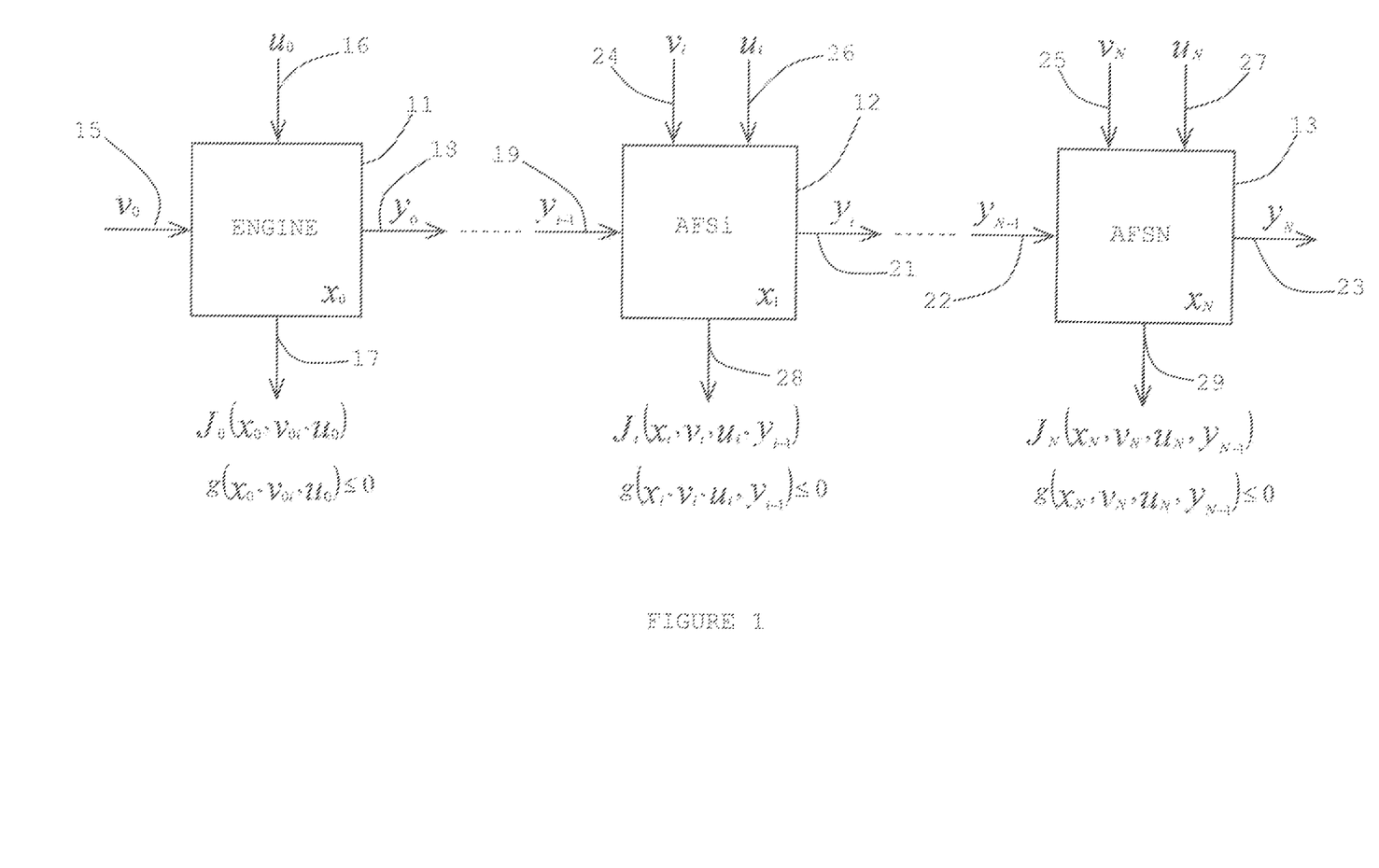
FIG. 1 is a diagram of a basic scheme of the present system for integrated optimization and control of an engine with one or more aftertreatment subsystems.

FIG. 1 is a block diagram of a basic scheme of the present system for integrated optimization and control of an engine with one or more aftertreatment systems. The various blocks represent an engine 11, and several aftertreatment systems (AFSs) 12 and 13. Aftertreatment system 13 may be the last system and be denoted by an "N". "N" may also indicate the total number of aftertreatment systems. An aftertreatment system 12 between engine 11 and aftertreatment system N may be denoted by an "i". There may be any number of aftertreatment systems. If there is one aftertreatment system, then it may be represented as system N, wherein N=1.

"$x_0$" within the symbol for engine 11 may indicate an internal state of the engine. "$x_i$" and "$x_N$" may indicate internal states of AFSi 12 and AFSN 13, respectively. "$^1V$" may represent an external input 15 to engine 11. The external input may incorporate disturbance, fluid price, and so on. Similarly, "$v_i$" and "$v_N$" may represent external inputs 24 and 25 for AFSi 12 and AFSN 13, respectively. A "$u_0$" input 16 may represent an actuator or actuators of engine 11, a "$u_i$" input 26 may represent an actuator or actuators of AFSi 12, and a "$u_N$" input 27 may represent an actuator or actuators of AFSN 13. Inputs 16, 26 and 27 may incorporate actuator inputs.

"$J_0(x_0,v_0,u_0)$" on an output 17 may represent a subsystem cost function of $x_0$, $v_0$ and/or $u_0$ for engine 11. "$g(x_0,v_0,u_0) \leq 0$" also on output 17 may represent subsystem constraints of $x_0$, $v_0$ and/or $u_0$ for engine 11. "$y_0$" may represent an interconnection output 18 from engine 11 which may be an interconnection input "$y_{i-1}$" 19 to AFSi 12, assuming that AFSi 12 is the first AFS connected to engine 11, where i=1. However, there may be one or more AFSs connected between engine 11 and AFSi 12. "$y_i$" may represent an interconnection output 21 from AFSi 12 which may be an interconnection input "$y_{N-1}$" 22 to AFSN 13, assuming that AFSN 13 is connected to AFSi 12. However, there may be one or more AFSs connected between AFSi 12 and AFSN 13. "$y_N$" may represent an output 23 of the AFSN 13 and the preceding AFSs from "1" through "N–1".

"$J_i(x_i,v_i,u_i,y_{i-1})$" on an output 28 may represent a subsystem cost function of $x_i$, $v_i$, $u_i$ and/or $y_{i-1}$ for AFSi 12. "$J_i(.)$" may be an abbreviated designation of the subsystem cost function. "$g(x_i,v_i,u_i,y_{i-1}) \leq 0$" also on output 28 may represent subsystem constraints of $x_i$, $v_i$, $u_i$ and/or $y_{i-1}$ for AFSi 12. "$g(.)$" may be an abbreviated designation of the subsystem constraints. "$J_N(x_N,v_N,u_N,y_{N-1})$" on an output 29 may represent subsystem cost function of $x_N$, $v_N$, $u_N$ and/or $y_{N-1}$ for AFSN 13. "$g(x_N,v_N,u_N,y_{N-1}) \leq 0$" also on output 29 may represent subsystem constraints of $x_N$, $v_N$, $u_N$ and/or $y_{N-1}$ for AFSN 13. The similar designations may be made for additional AFSs, if any, between engine 11 and AFSi 12 and between AFSi 12 and AFSN 13, as done herein with the $x_s$, $v_s$, $u_s$ and $y_s$.

Figure 2:
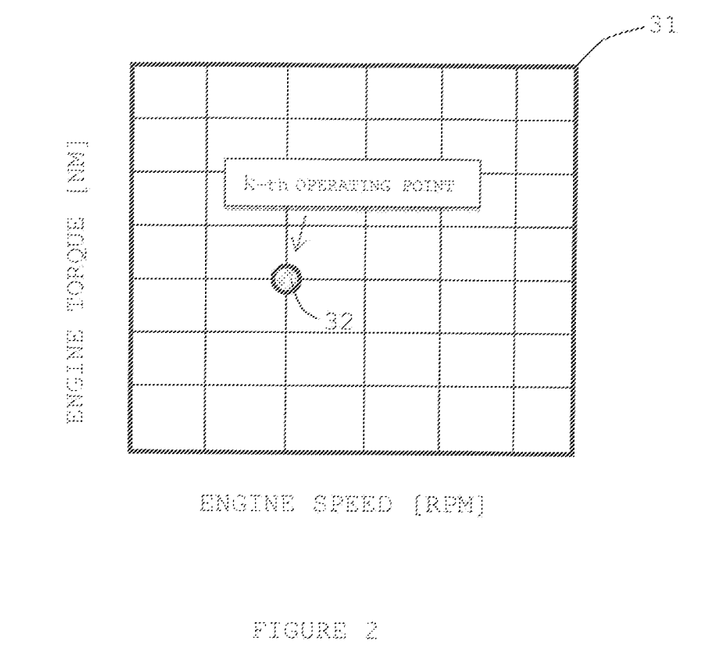
FIG. 2 is a diagram of an illustrative example engine map.

FIG. 2 may aid in illustrating off-line optimization. An objective may be to compute optimal steady-state engine maps for virtually all of the operating points, for example, in an engine speed-torque space as shown with a graph 31 of engine torque (nm) versus engine speed (rpm). Graph 31 illustrates an example k-th operating point 32 plotted at a specific torque and engine speed. The k-th operating point may represent any point at various locations on graph 31.

An optimization problem in each operating point may be indicated by:

$$\min_U J = \sum_{i=0}^{N} J_i(x_i, v_i, u_i, y_{i-1}); U = \{u_0, u_1, \ldots, u_N\}$$

$$\text{s.t. } g(x_i, v_i, u_i, y_{i-1}) \leq 0; i = 0, 1, \ldots, N.$$

The resulting optimal steady-state maps may be indicated by:

$$u_i^{ss} = f_{u_i}(v_0, \ldots, v_N) \text{ and}$$

$$y_i^{ss} = f_{y_i}(v_0, \ldots, v_N).$$

Abbreviated designations of the steady-state map indications may be $u_i^{ss} = f_{u_i}(.)$ and $y_i^{ss} = f_{y_i}(.)$, respectively. It may be noted that the maps may also be parameterized by $x_i$ under certain conditions.

Figure 3:
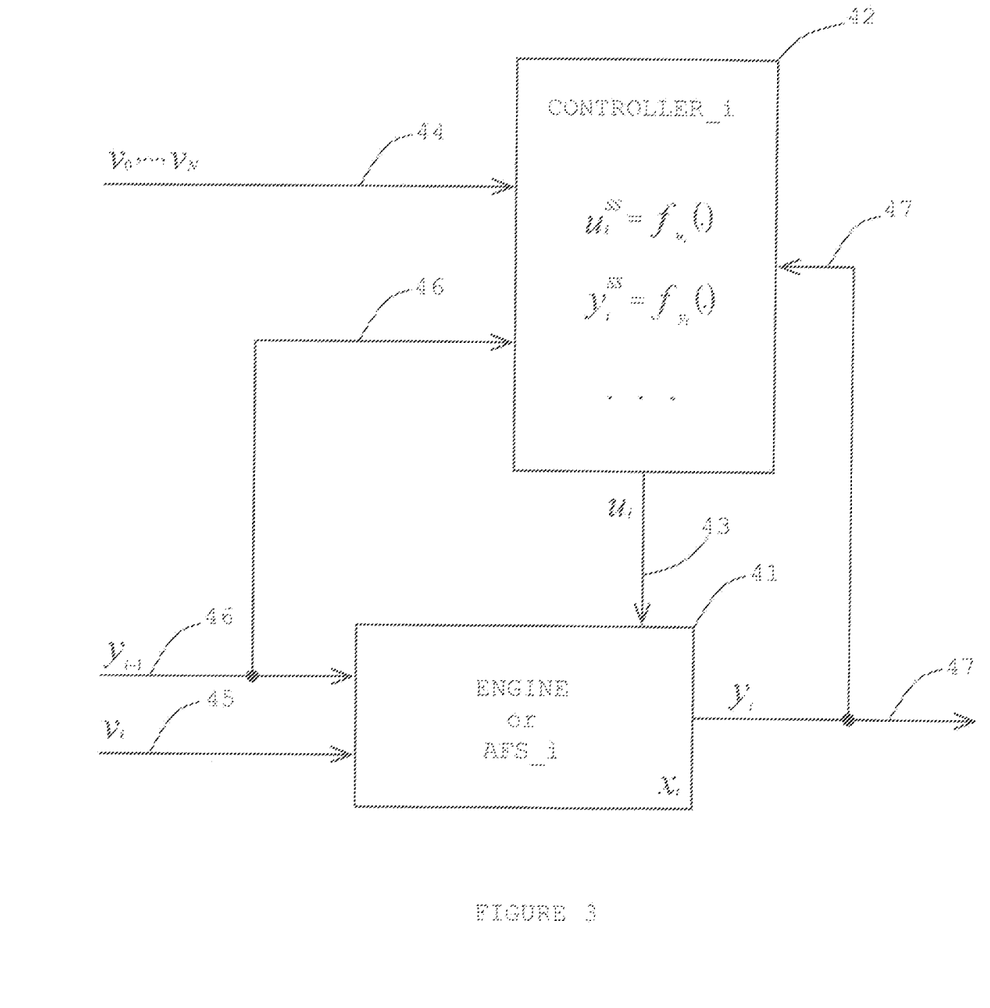
FIG. 3 is a diagram of an illustrative example engine or aftertreatment subsystem interconnected with a controller.

An on-line part (real-time) for an i-th aftertreatment subsystem or an engine may be illustrated in FIG. 3. A controller may be integrated with an engine and an AFS. An engine or AFS_i 41 may have an internal state of $x_0$ or $x_i$, respectively. An actuator input $u_0$ or $u_i$ 43 may go to the engine or AFS_i 41, respectively. The actuator input 43 may come from a controller_0 or a controller_i 42, respectively. Controller 42 may provide steady state maps as represented by symbols $u_0^{ss} = f_{u_0}(.)$ and $y_0^{ss} = f_{y_0}(.)$ or $u_i^{ss} = f_{u_i}(.)$ and $y_i^{ss} = f_{y_i}(.)$, respectively. The controller_i 42 may be implemented by MPC controller. External inputs $v_0, \ldots, v_N$ 44 (i.e., disturbance, fluid price, and so forth) may be provided to controller 42. A specific input $v_0$ or $v_i$ 45 may be input to engine or AFS_i 41, respectively. An interconnection output $y_{i-1}$ 47 from an engine or an AFS_i–1 may be an input 46 to AFS_i 41 and controller_i 42. There may be an interconnection output $y_0$ or $y_i$ 47 from the engine or AFS_i 41 as an input 46 for an AFS_i+1 or an AFS_N. Interconnection output 47 may also go to controller_i 42. In general, 47 may contain also signals which are not interconnections but measurements of variables that can be useful for integrated optimization.

Figure 4:
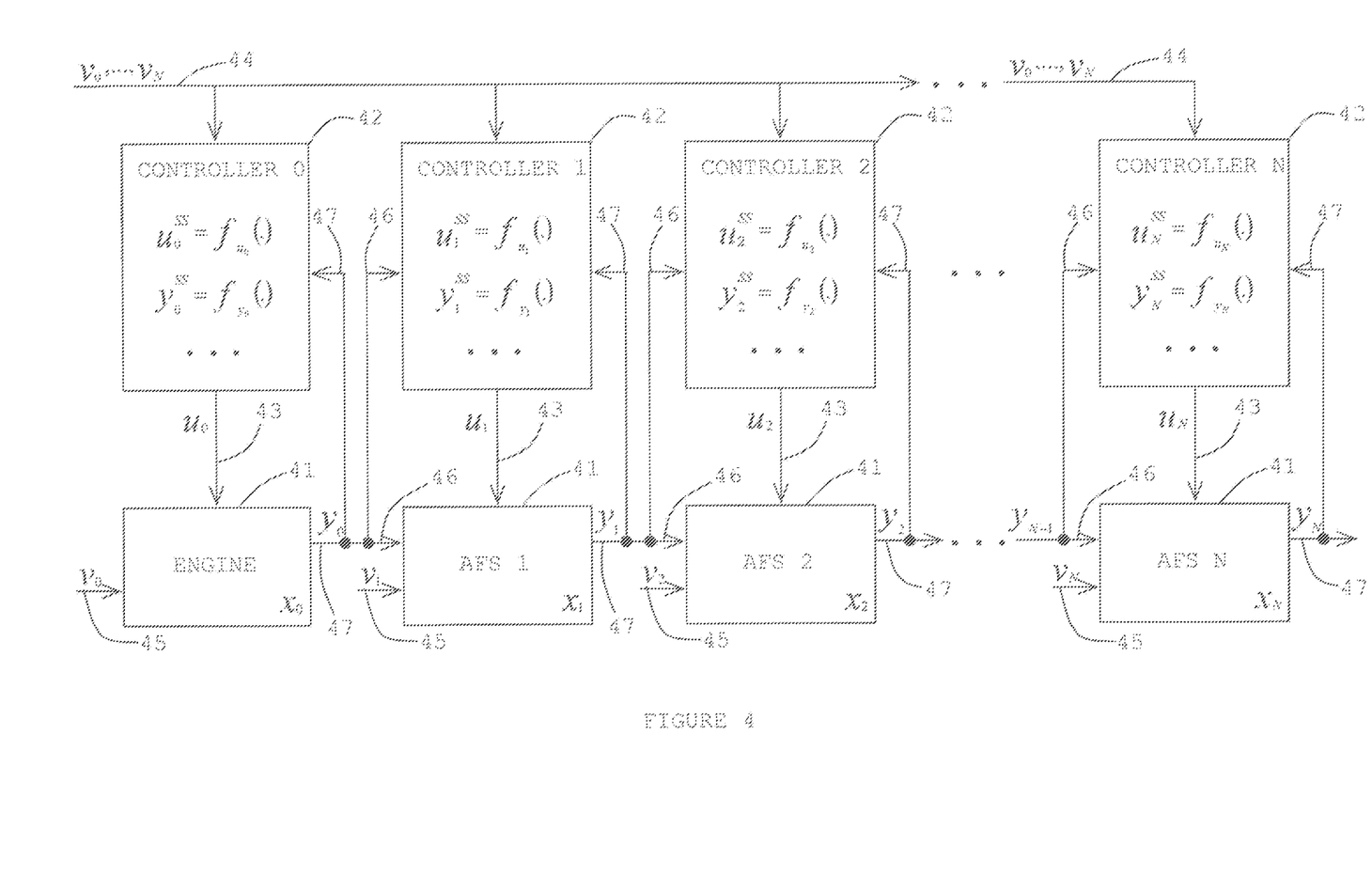
FIG. 4 is a diagram of the example in FIG. 3 with an engine and a multiple of aftertreatment subsystems.

The on-line part for an i-th subsystem of FIG. 3 may be illustrated as an engine and multiple AFSs connected in a diagram of FIG. 4. Two or more controllers 42 of FIG. 4 may be combined as one controller 42. The numerical labels are the same for similar components and lines as shown in FIG. 3.

Figure 5:
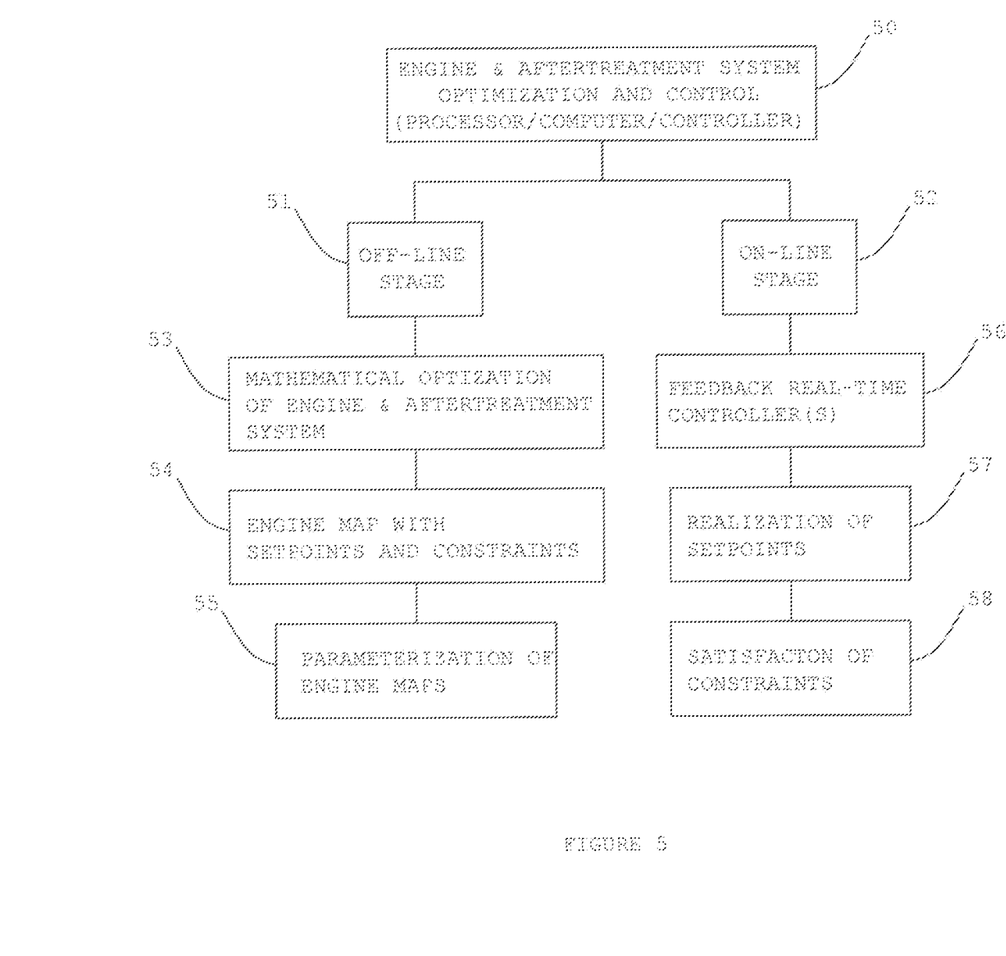
FIG. 5 is a diagram of an illustrative example of an approach for the engine and aftertreatment system.

FIG. 5 is diagram of a two-part engine and aftertreatment optimization control approach 50 with an off-line stage 51 and an on-line stage 52. At the off-line stage 51 may be a mathematical optimization of the engine and aftertreatment system at symbol 53, an engine map with setpoints and constraints at symbol 54, and a parameterization of engine maps at symbol 55. At the on-line stage 52 may be feedback real-time controller or controllers at symbol 56, a realization of setpoints at symbol 57, and a satisfaction of constraints at symbol 58.

Some of the items or activities of the disclosed system in FIGS. 1-5 not covered by one or more controllers may be performed by a processor/computer.

A recap of the disclosure is provided in the following. An engine and aftertreatment system may incorporate an engine, an aftertreatment mechanism connected to the engine, and a controller connected to the engine and the aftertreatment mechanism. The controller may have an optimization program. The optimization program may be for optimized performance of the engine and the aftertreatment mechanism integrated as one system. Optimized performance may incorporate reducing emissions and increasing fluid efficiency of the one system.

The optimization program may incorporate the aftertreatment mechanism for reducing emissions from an exhaust of the engine to a prescribed level, and increasing fluid efficiency of the engine and the aftertreatment mechanism while the emissions are reduced at least down to the prescribed level.

The engine may incorporate a control input to actuators on the engine, an interconnection output and an information output. The information output may indicate engine costs and/or engine constraints. The aftertreatment mechanism may incorporate an interconnection input connected to the interconnection output of the engine, a control input to actuators on the aftertreatment mechanism, an interconnection output, and an information output. The information output may indicate aftertreatment mechanism costs and/or aftertreatment mechanism constraints. The costs and constraints may be a basis incorporated in the optimization program for optimized performance of the engine and the aftertreatment mechanism integrated as one system.

The controller may further incorporate a first input connected to the interconnection output of the engine, a first output connected to the control input to actuators of the engine, a second input connected with the interconnection input of the aftertreatment mechanism, a third input connected to the interconnection output of the aftertreatment mechanism, and a second output connected to the control input to actuators of the aftertreatment mechanism.

The controller may further incorporate a feedback loop for disturbance rejection, minimizing an impact of variability of performance of the engine, and/or delivering predetermined performance of the aftertreatment mechanism during transient operation of the engine, and maps prescribing setpoints and constraints for measured variables and positions of engine actuators for one or more operating points of the engine. The maps may be parameterized by variables of the engine and the aftertreatment mechanism. The maps may be a basis incorporated in the optimization program for optimized performance of the engine and the aftertreatment mechanism integrated as one system.

An approach for engine and aftertreatment optimization and control may incorporate formulating an off-line part which involves mathematically optimizing an engine and aftertreatment system, providing engine maps prescribing setpoints and constraints for measured variables from sensors and positions of engine actuators for operating points and conditions of the engine, and parameterizing the engine maps with variables of the engine and the aftertreatment system.

The approach for engine and aftertreatment optimization and control may also incorporate formulating an on-line part providing one or more feedback real-time controllers realizing the setpoints of the engine and aftertreatment system, and satisfying computed constraints with the one or more controllers. The one or more controllers may be model predictive controllers.

The one or more controllers may ensure disturbance rejection, minimization of input of engine components production variability, and/or engine aging. The one or more controllers may deliver needed performance during an engine transient operation.

The approach may further incorporate parameterizing the engine and aftertreatment system by measured fuel, urea consumption and/or corresponding costs. The approach may also further incorporate parameterizing a control system with market price information of fuel and other fluids used by the engine and aftertreatment system. There may also be parameterizing the control system to tune the controller when there are changes of prices of fluids used by the engine and aftertreatment system to ensure economically optimal operation of the engine during the changes.

There may be a system of an engine and aftertreatment subsystem incorporating an engine, an aftertreatment subsystem connected to the engine, and a controller connected to the engine and the aftertreatment subsystem. The controller may receive signals from sensors of the engine and the aftertreatment subsystem, process the signals, and provide signals to actuators of the engine and the aftertreatment subsystem according to an optimization program for optimized performance of the engine and the aftertreatment subsystem as one system. The optimized performance may incorporate reducing emissions and increasing fluid efficiency of the one system.

The external inputs of the engine and the aftertreatment subsystem may be connected to the controller. The controller may incorporate engine maps for operating points of the engine. The maps may be a basis for optimized performance of the engine and the aftertreatment subsystem as one system. The maps may prescribe setpoints and constraints for measured variables from the sensors and for actuators.

The engine may incorporate an external input and an actuator input from the controller, and an interconnection output connected to the controller. The external input may have external information pertinent to the engine.

The aftertreatment subsystem may incorporate an interconnection input connected to the interconnection output of the engine and connected to the controller, an external input, an actuator input from the controller, and an interconnection output connected to the controller. The external input may have external information pertinent to the aftertreatment subsystem.

The engine may further incorporate an internal state and an information output. The information output may indicate engine costs as a function of the engine internal state, the external input and/or the actuator input.

The aftertreatment subsystem may further incorporate an internal state and an information output. The information output may indicate aftertreatment costs as a function of the aftertreatment subsystem internal state, the external input, actuator input, and/or the interconnection input.

The information output of the engine may indicate engine constraints as a function of the internal state, the external input and/or the actuator input of the engine. The information output of the aftertreatment subsystem may indicate aftertreatment constraints as a function of the internal state, the external input, the actuator input, and/or the interconnection input of the aftertreatment subsystem. The costs and constraints may be a basis for optimized performance of the engine and the aftertreatment subsystem as one system.

An approach for controlling a combined engine and aftertreatment system may incorporate providing an engine, adding one or more aftertreatment subsystems to result in a combined engine and aftertreatment system, connecting one of the one or more aftertreatment subsystems to an exhaust output of the engine, and manipulating actuators of the engine and the one or more aftertreatment subsystems with one or more controllers to change the properties of the exhaust for optimal operation of the combined engine and aftertreatment system. Optimal operation may incorporate reduction of emissions and improvement of fluid efficiency of the combined engine and aftertreatment system.

To change the properties of the exhaust may incorporate reducing an amount of pollutants in the exhaust to a magnitude equal to or less than a prescribed magnitude. Manipulating the actuators of the engine may increase fuel economy of the engine if the one or more aftertreatment subsystems reduce an amount of pollutants in the exhaust to a magnitude equal to or less than the prescribed magnitude.

The approach may further incorporate providing one or more engine maps as a basis for optimal operation of the combined engine and aftertreatment system, processing the one or more engine maps prescribing setpoints and/or constraints for measured variables and positions of the actuators on the engine for operating points and/or conditions of the engine, and parameterizing the engine maps by variables of the engine and of the one or more aftertreatment subsystems.

The approach may further incorporate parameterizing the engine maps by costs of fuel consumed by the engine and/or urea consumed by the one or more aftertreatment subsystems. The one or more engine maps may incorporate a speed and torque map of the engine. The one or more controllers may be connected to the engine and the one or more aftertreatment subsystems of the combined engine and aftertreatment system. The one or more controllers may ensure realization of the setpoints, and/or ensure satisfaction of the constraints.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An engine monitoring system comprising:
    an engine having engine actuators and including at least a variable geometry turbocharger (VGT) wherein at least one of the engine actuators is associated with the VGT, wherein the engine is configured to discharge exhaust gasses;
    an aftertreatment system configured to receive the exhaust gasses from the engine, reduce pollutants in the exhaust gasses below an emission limit, and emit a discharged gas;
    sensors configured to sense properties in the exhaust gasses; and
    a controller operatively coupled to the engine and the sensors and configured to:
        receive measurements of the sensed properties in the exhaust gasses from the sensors;
        control the VGT to raise a temperature of the exhaust gasses when a state of the aftertreatment system does not enable reduction of the pollutants to a level below the emission limit due to low temperature; and
        control the engine actuators to maximize a fuel economy of the engine when the state of the aftertreatment system does enable reduction of the pollutants to a level below the emission limit.

2. The engine monitoring system of claim 1, wherein the controller uses the measurements of the sensed properties in the exhaust gasses and a set of engine maps to determine setpoints and constraints for the engine actuators to maximize the fuel economy of the engine.

3. The engine monitoring system of claim 2, wherein the set of engine maps includes at least one of an engine speed map and a torque map.

4. The engine monitoring system of claim 1, wherein the controller further uses a consumption of fuel and a consumption of urea to maximize the fuel economy of the engine.

5. The engine monitoring system of claim 1, wherein the controller further uses a market price of fuel to maximize the fuel economy of the engine.

6. The engine monitoring system of claim 1, wherein the controller further uses an aging of the engine actuators to maximize the fuel economy of the engine.

7. An engine monitoring system comprising:
    an engine having engine actuators and including at least a turbocharger having a turbine and a wastegate (WG) configured to controllably allow exhaust gasses to bypass the turbine, wherein at least one of the engine actuators controls a position of the WG, and wherein the engine is configured to discharge the exhaust gasses;
    an aftertreatment system configured to receive the exhaust gasses from the engine, reduce pollutants in the exhaust gasses below an emission limit, and emit a discharged gas;
    sensors configured to sense properties in the exhaust gasses; and
    a controller operatively coupled to the engine and the sensors and configured to:
        receive measurements of the sensed properties in the exhaust gasses from the sensors;
        control the WG to raise a temperature of the exhaust gasses when a state of the aftertreatment system does not enable reduction of the pollutants to a level below the emission limit due to low temperature; and
        control the engine actuators to maximize a fuel economy of the engine when the state of the aftertreatment system does enable reduction of the pollutants to a level below the emission limit.

8. The engine monitoring system of claim 7, wherein the controller uses the measurements of the sensed properties in the exhaust gasses and a set of engine maps to determine setpoints and constraints for the engine actuators to maximize the fuel economy of the engine.

9. The engine monitoring system of claim 8, wherein the set of engine maps includes at least one of an engine speed map and a torque map.

10. The engine monitoring system of claim 7, wherein the controller further uses a consumption of fuel and a consumption of urea to maximize the fuel economy of the engine.

11. The engine monitoring system of claim 7, wherein the controller further uses a market price of fuel to maximize the fuel economy of the engine.

12. The engine monitoring system of claim 7, wherein the controller further uses an aging of the engine actuators to maximize the fuel economy of the engine.

13. A method for monitoring an engine system comprising an engine having engine actuators including at least one of a variable geometry turbocharger (VGT) or a turbocharger with a wastegate (WG), the engine system also including an aftertreatment system configured to receive exhaust gas from the engine, reduce a level of pollutants in the exhaust gas below an emission limit, and emit a discharge gas, the method comprising:
    receiving measurements of sensed properties in the exhaust gas;
    controlling at least one of the VGT or WG to raise a temperature when a state of the aftertreatment systems does not enable reduction of the level of the pollutants to a level below the emission limit due to low temperature; and controlling the engine actuators to maximize a fuel economy of the engine when the state of the aftertreatment system does enable reduction of the level of pollutants to a level below the emission limit.

14. The method of claim 13, wherein the measurements of sensed properties in the exhaust gas and a set of engine maps are used to determine setpoints and constraints for the engine actuators to maximize the fuel economy of the engine.

15. The method of claim 14, wherein the set of engine maps includes at least one of an engine speed map and a torque map.

16. The method of claim 13, wherein a consumption of fuel and a consumption of urea are used to maximize the fuel economy of the engine.

17. The method of claim 13, wherein a market price of fuel is used to maximize the fuel economy of the engine.

18. The method of claim 13, wherein the engine includes the VGT and not the turbocharger with the wastegate, and the step of controlling at least one of the VGT or WG comprises controlling the VGT to raise the temperature.

19. The method of claim 13, wherein the engine includes the turbocharger with the wastegate and not the VGT, and the step of controlling at least one of the VGT or WG comprises controlling the WG to raise the temperature.

20. The method of claim 13 wherein the engine also includes a throttle, and the step of controlling at least one of the VGT or WG further includes controlling the throttle to raise the temperature.

* * * * *